M. T. BAIRD.
AUTOMATIC STARTER FOR MOTOR VEHICLES.
APPLICATION FILED MAY 27, 1911.

1,033,978.

Patented July 30, 1912.

Witnesses:
Lottie M. Fox
Bertha von Behrens.

Inventor:
Myron T. Baird,
By
Hugh K. Wagner
His Attorney.

M. T. BAIRD.
AUTOMATIC STARTER FOR MOTOR VEHICLES.
APPLICATION FILED MAY 27, 1911.

1,033,978.

Patented July 30, 1912.
7 SHEETS—SHEET 2.

Fig. 2.

Witnesses:
Lottie M. Fox.
Bertha von Behrens.

Inventor:
Myron T. Baird,
By Hugh K. Wagner
His Attorney.

M. T. BAIRD.
AUTOMATIC STARTER FOR MOTOR VEHICLES.
APPLICATION FILED MAY 27, 1911.

1,033,978.

Patented July 30, 1912.

M. T. BAIRD.
AUTOMATIC STARTER FOR MOTOR VEHICLES.
APPLICATION FILED MAY 27, 1911.

1,033,978.

Patented July 30, 1912.

Witnesses:
Lottie M. Fox.
Bertha von Behrens

Inventor:
Myron T. Baird,
By Hugh K. Wagner
His Attorney.

M. T. BAIRD.
AUTOMATIC STARTER FOR MOTOR VEHICLES.
APPLICATION FILED MAY 27, 1911.

1,033,978.

Patented July 30, 1912.
7 SHEETS—SHEET 6.

Witnesses:
Lottie M. Fox
Bertha von Behrens

Inventor:
Myron T. Baird,
By Hugh K. Wagner
His Attorney.

UNITED STATES PATENT OFFICE.

MYRON T. BAIRD, OF ST. LOUIS, MISSOURI.

AUTOMATIC STARTER FOR MOTOR-VEHICLES.

1,033,978.

Specification of Letters Patent. Patented July 30, 1912.

Application filed May 27, 1911. Serial No. 629,830.

*To all whom it may concern:*

Be it known that I, MYRON T. BAIRD, a citizen of the United States, residing at the city of St. Louis, State of Missouri, have invented certain new and useful Improvements in Automatic Starters for Motor-Vehicles, (Case B,) of which the following is a specification.

The present invention has reference to automatic starters for motor vehicles, and more especially to that type of starter wherein the power utilized to start the motor has been stored up by the latter during its previous operation.

It comprehends, primarily, certain improvements, hereinafter described at length, in or relating to the distributer for supplying a charge of explosive mixture to the proper engine cylinder, and the selector operatively associated with said distributer.

A structural embodiment of the invention is illustrated in the accompanying drawings, wherein:

Fig. 7 is a vertical section taken on the line 7—7 of Fig. 6, Figs. 8 and 9 are vertical sections taken, respectively, through the oil cup and the carbureter on the lines 8—8 and 9—9 of Fig. 7.

In said drawings, 1 designates the crank-case, and 2 the shaft of a multi-cylinder engine of any preferred or conventional type. Upon the engine base 3, or in any other suitable location, there is mounted an air-compressor 4 which is operated from a moving part of the engine through the intermediary of driving connections 5. Said compressor has a pipe connection 6 with a storage tank 7, from which latter the compressed air is supplied by a pipe 8 to a carbureter 9.

The element 9, last mentioned, is preferably formed by a hollow casting provided with a tapered bore or chamber wherein a correspondingly-shaped valve 10 is rotatably fitted. The interior valve is drilled to procure the longitudinally-arranged mixing chamber 11, into which latter open a pair of horizontal ports 12 and 13 formed one below the other through the valve walls, the upper port 13 also opening into the corresponding end of a vertical passage 14 that is formed in the wall of said chamber and extends downwardly to a point opposite the lower port 12. Said ports 12 and 13 constitute both the inlets to and the outlets from the mixing chamber 11, as will be explained at length hereinafter.

To admit the gasolene and compressed air into the carbureter, the casing of the latter is formed (as depicted in Figs. 7, 9, 10 and 11), with a pair of lower ports 15 and 16 that are located at substantially 90° apart from each other in the plane of the lower valve port 12, and, also, with a pair of upper ports 17 and 18 that are arranged in a similar manner in the plane of the upper valve port 13, the four casing ports opening in the order mentioned into hollow plugs or nipples 19, 20, 21, and 22 provided upon said casing. The ports 15 and 17 and their communicating plugs 19 and 21 serve as inlets for the gasolene, the port 16 and its plug 20 as the air inlet, and the port 18 and nipple 22 as the outlet for the mixture. The aforesaid plugs 19 and 21 have joined thereto the lower ends of a pair of pipes 23 and 24 whose upper ends communicate with the interior of a gasolene cup 25. In the construction illustrated, the bottom of this cup is formed with an axial outlet passage 26 which terminates in a pair of oppositely-extending branches 27 and 28, said branches being continued through the plugs 29 and 30 to which the last-named ends of the pipes 23 and 24 are directly attached; (see Fig. 8). The outlet end of the air supply pipe 8 opens into plug 20, and the outlet plug 22 opens directly into one end of a short pipe 31, or similar tubular connection, that leads to the distributer hereinafter described.

Figures 7, 8, 9:
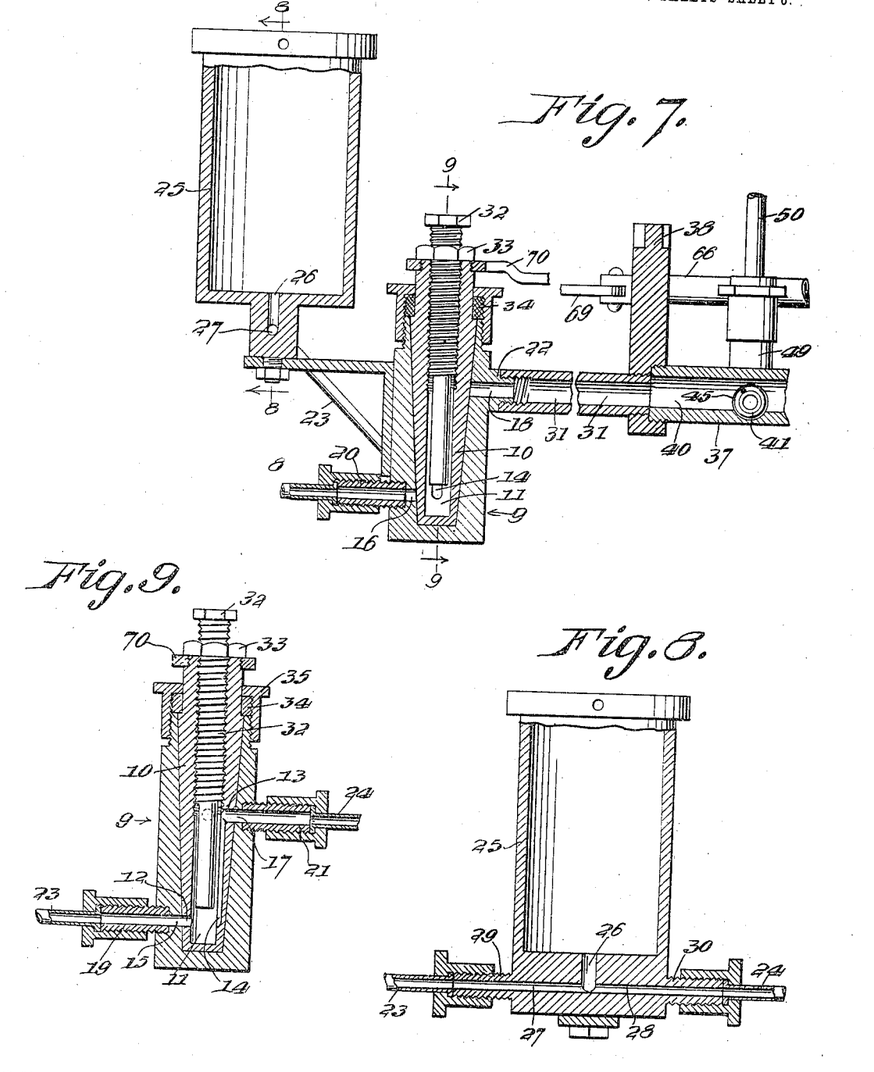
Figure 10:
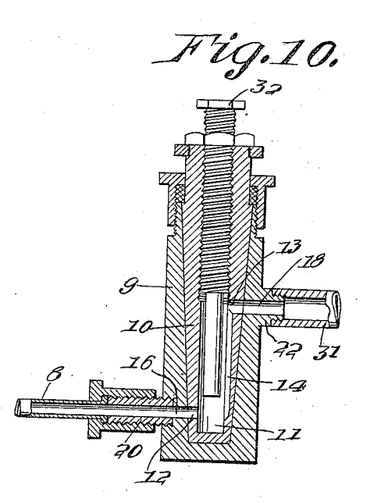
Fig. 10 is a sectional view similar to Fig. 9, but showing the position of the carbureter valve during actuation of the starter.
Figure 11:
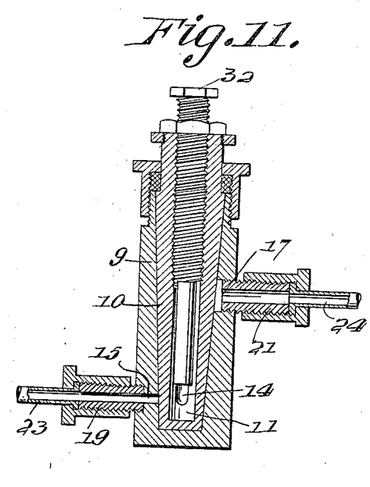
Fig. 11 is a sectional view taken at right angles to Fig. 10.

Valve 10 normally occupies the position shown in Figs. 7 and 9, in which position its gasolene inlet ports 12 and 13 are in registration with the casing ports 15 and 17, and, hence, are open to admit the fluid into chamber 11, while the air inlet port 16 and the discharge port 18 for the mixture are closed. When, however, said valve is given a quarter-turn, the above conditions will be reversed, the valve ports being brought into registration with ports 16 and 18, while the supply of gasolene is cut off, the gasolene already in the valve chamber mixing with the in-coming air and being forced thereby through ports 13 and 18 into nipple 22, and thence into pipe 31.

Means is provided for regulating the quantity of gasolene admitted into the mixing chamber, such means comprising, in the present instance, a screw 32 which is adjustably fitted in said chamber, the threaded upper portion of said screw being engaged with the correspondingly threaded upper portion of the wall of the chamber, while its lower portion is appreciably reduced. To hold the screw in adjusted position, a nut 33, or similar device, may be utilized, said nut being designed to be tightened against the end of the projecting stem of valve 10; to hold the valve itself against displacement, a gasket 34 is interposed between the carbureter cap 35 and the shoulder produced at the junction of the valve body and stem.

Figure 12:
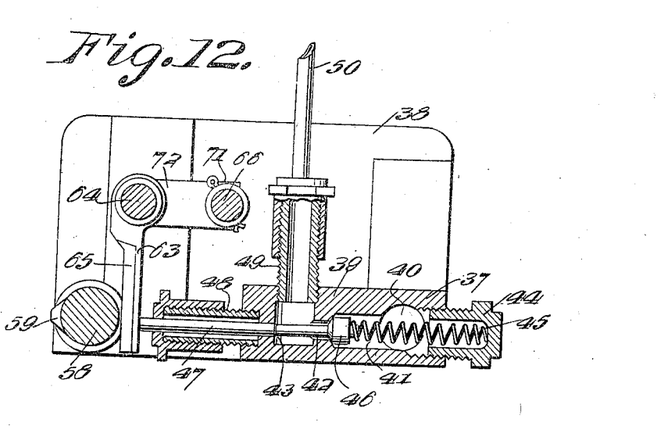
Fig. 12 is a transverse vertical section taken on the line 12—12 of Fig. 2.
Figures 13, 14:
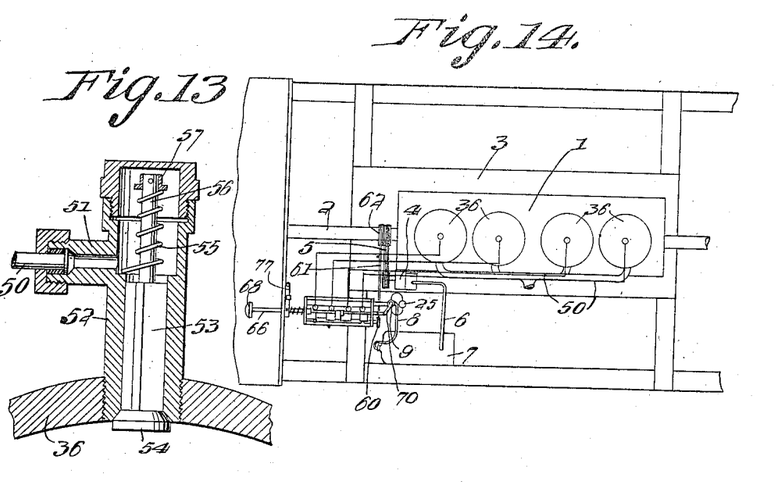
Fig. 13 is an enlarged vertical section taken on the line 12—12 of Fig. 1.
Fig. 14 is a diagrammatical plan view on a reduced scale, showing the complete application of the invention.

From the pipe 31 above referred to, the charge of explosive mixture passes into a distributer whence, in turn, it is supplied to the proper engine cylinder 36, i. e., the particular cylinder whose piston is in position to start on the spark, that cylinder being determined by means of the selector. The aforesaid distributer comprises a hollow or tubular body member 37 supported at its ends in a pair of plates 38, the front end of said member being closed, while its rear end opens directly into pipe 31. This member is provided with a series of hollow lateral extensions 39 corresponding in number with the number of engine cylinders, and its bore 40 intersects the bore 41 of each extension intermediate the ends of the latter, as depicted in Fig. 12. The inner end of each bore 41 is restricted, as indicated by the numeral 42, to produce a valve seat, and is then again enlarged to form the passage 43; the outer end of the bore has fitted therein a hollow plug 44 which receives one end of a controlling spring 45 whose other end bears against the head of a valve 46, thus holding same normally in the seat above referred to and, in consequence, cutting out communication between the main bore 40 and the passage 43. The rod or stem 47 of each valve 46 extends across the adjacent passage 43 and projects loosely through a hollow plug 48 attached to the corresponding extension, the latter also having affixed to it a second hollow plug 49 whose bore opens directly into the said passage 43. In each plug 49 is fitted one end of a pipe 50 which leads to one of the engine cylinders and has its opposite end fitted in a hollow plug 51 provided upon the casing 52 of an "admission" valve mounted upon the upper head or top of the cylinder, the term "admission" valve being employed to differentiate inlet valve for the "starting" charge from the usual inlet and exhaust valves for the operating charge and the spent gases with which the cylinder is also equipped. The starting charge, on entering a casing, is directed against the upper end of a valve body 53 whose enlarged lower end is normally held in a seat 54 formed in the corresponding end of the casing by means of a spring 55, as illustrated in Fig. 13. The stem 56 of said valve body, or valve proper, is of reduced diameter, and one end of the opening 55 bears against the shoulder resultant from the formation thereof, the opposite end of said spring bearing against a cap 57 or similar projection, fastened to the free end of said stem. The charge will, therefore, force the valve inwardly and then pass into the combustion chamber of the engine.

In order to determine the proper cylinder to which the charge is to be supplied, a selector is provided, as has already been stated. This device preferably comprises a rotary element which is operated from a moving part of the engine, and is designed to move relatively to all of the distributer valves while the engine is running, and a second element operable by the rotary element and adapted, in turn, to operate the selected valve when the engine is to be started. The first of these elements is constituted, in the construction illustrated, by a shaft 58 provided with a series of projecting cam-lugs or cams 59 which correspond in number to the number of engine cylinders and are arranged spirally around the periphery of the shaft, the latter having secured thereto a pulley 60 connected by a belt 61 with a driving pulley 62 carried by the engine shaft 2. The second element consists in the present instance, of a series of depending cam plates 63 mounted loosely on a shaft 64 and having beveled rear edges 65. The shafts 58 and 64 are supported at their ends in parallel relation in the frame constituted by the plates 38, and the latter shaft is mounted for longitudinal movement, as hereinafter described. Plates 63 are arranged in spaced relation upon shaft 64 and are located directly opposite and in contact with the free ends of the valve stems 47, so that, when one of said plates is rocked or swung inwardly by the corresponding cam 59, it will, in turn, force the adjacent valve stem inwardly against the action of its controlling spring 45, thereby opening communication between the passage 43 and the extension bore or passage 41.

Figure 1:
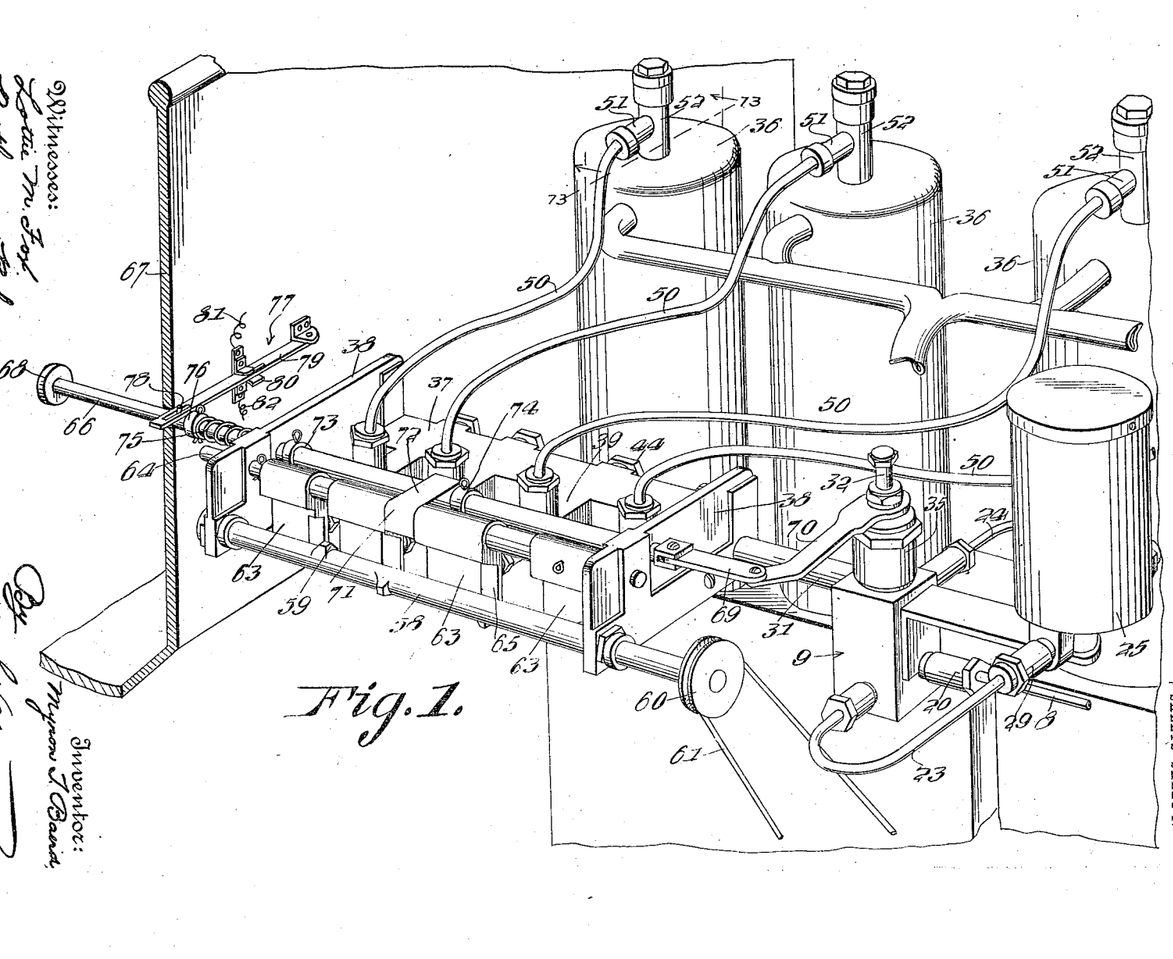
Figure 1 is a fragmental view of an explosive engine, with the improved starter applied thereto.
Figure 2:
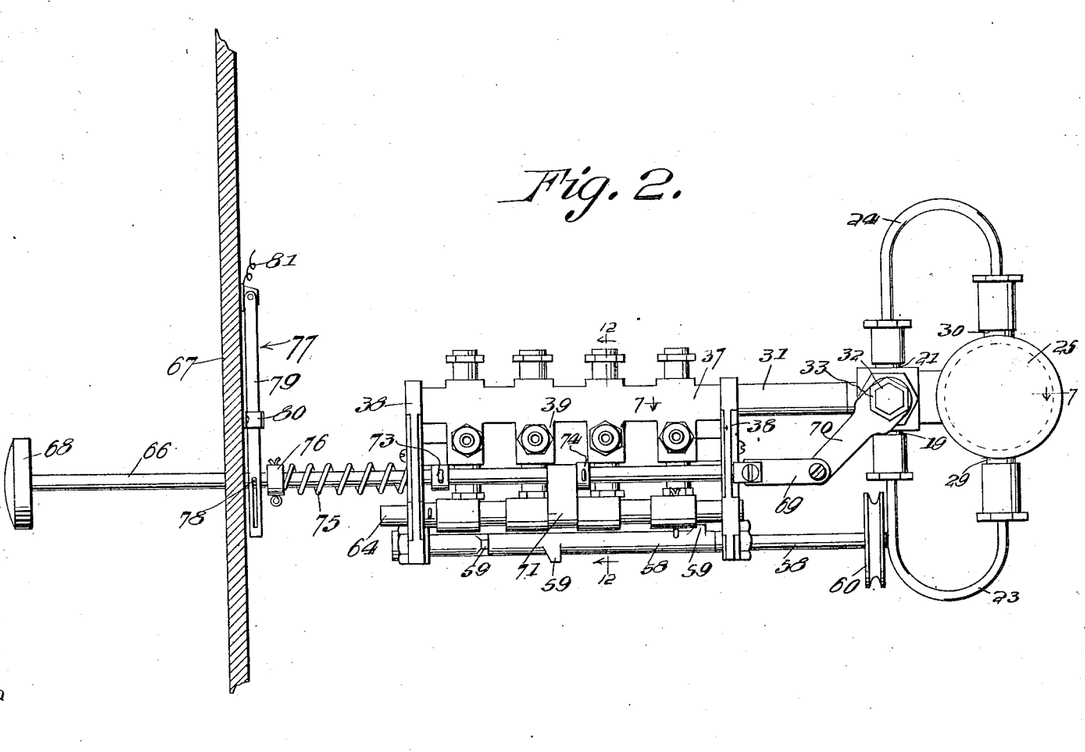
Fig. 2 is a plan view of the starter *per se*.
Figure 3:
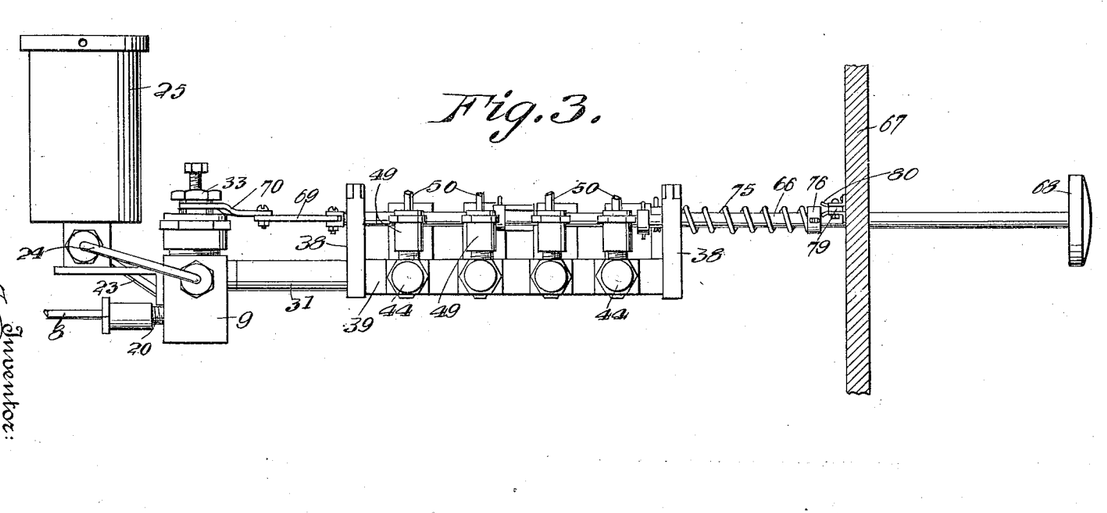
Fig. 3 is a side elevation thereof.

As regards the actuation of plates 63 by cams 59, it will be seen that, when the various parts of the selector are in their normal positions, as depicted in Figs. 1 and 2, the several cams are disposed approximately in line with the beveled edges of the corresponding cam plates, and hence, will not engage the plates during the rotation of shaft 58, but, when shaft 64 is moved forward through the intermediary of its hereinafter described connection with the main operating device, such movement will bring said edges past the paths of said cams. The aforesaid cams are so arranged that each time the engine stops one cam will project into the path of the plate corresponding to that particular cylinder whose piston is in position to start on the spark. Consequently, as the plates are moved forward, one of them will engage a cam and will be rocked inwardly thereby, thus opening the valve with which it is associated.

Figure 4:
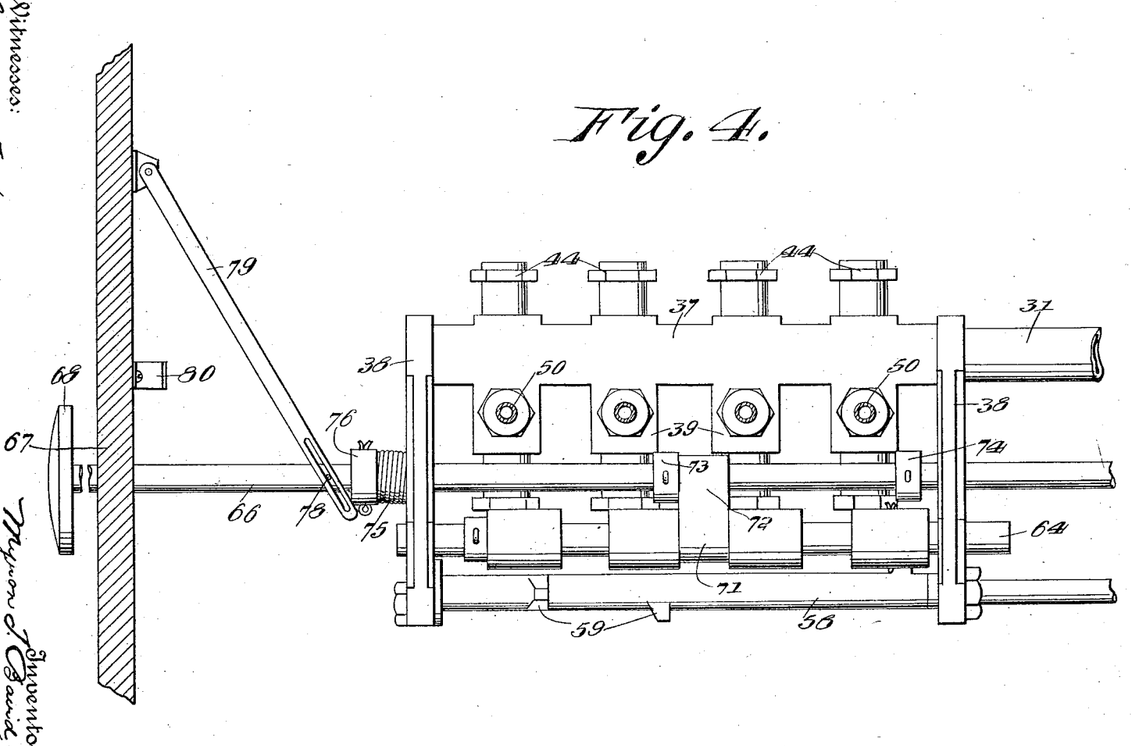
Figs. 4 and 5 are, respectively, a fragmental plan view and a side elevation on an enlarged scale, of the starter, showing the positions of the various component parts during actuation.
Figure 5:
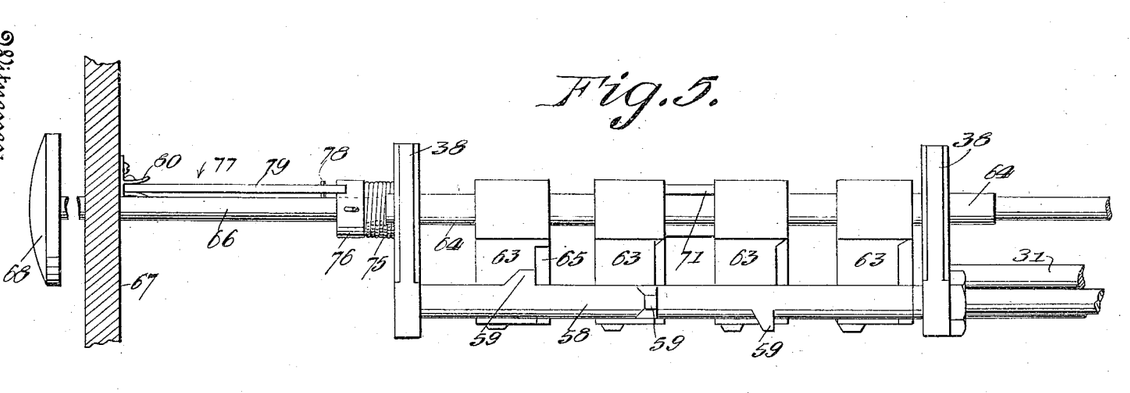
Figure 6:
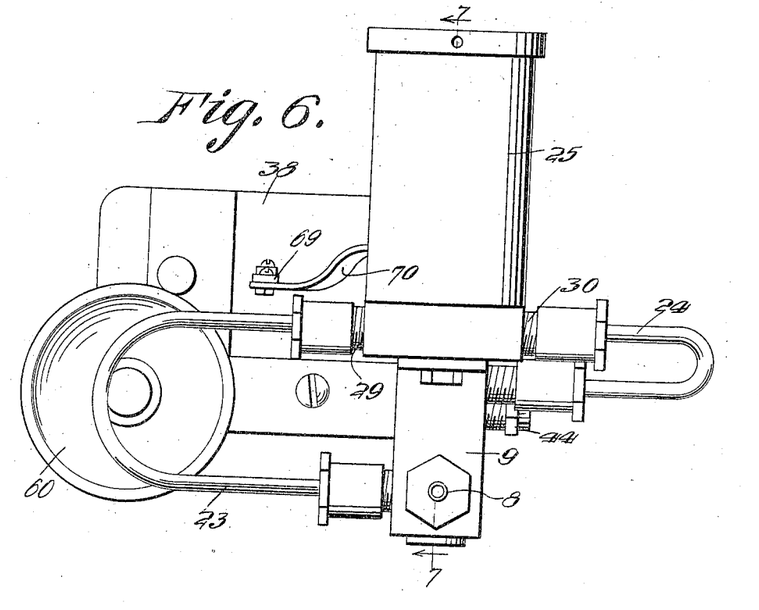
Fig. 6 is an enlarged rear elevation.

Means is provided in the present construction for simultaneously opening the carbureter valve 10 and operating the selector. Such means may advantageously comprise a single operating element which is connected both with the stem of said valve and with the endwise movable shaft 64. This element is preferably constituted by a push rod 66, which extends rearwardly through the dashboard 67, and terminates in a button or head 68, its front end being connected with the aforesaid valve stem through the intermediary of a pair of pivotally connected links 69 and 70, the latter of which has a rigid connection with the free end of said stem, as shown in Figs. 1 and 2. The connections between rod 66 and shaft 64 consist, preferably, of a collar 71, through which said shaft loosely passes, formed with a forked end 72 loosely engaging said rod, and a pair of collars 73 and 74 associated with said collar end and adapted to alternately engage the same, said collars being secured in any suitable manner (said rod and said collars being located upon opposite sides of said collar end;) see Figs. 1, 2 and 4. Rod 66 is slidably supported in openings in the plates 38 and is normally held at the limit of its rearward or outward movement by means of a spring 75 which bears at one end against the adjacent plate 38 and at its opposite end against a collar 76 secured to the rod.

The arrangement of the parts just described is such that the front collar 74 normally engages the forked end 72 of collar 71 and thus holds shaft 65 at the limit of its rearward movement, the rear collar 73, at the same time, abutting against the rear plate 38 of the supporting frame. When rod 66 is pushed inward or forward, collar 73 will be brought into engagement with end 72 and, as the inward movement of said rod is continued, will shift shaft 65 forward, thus effecting the opening of one of the distributer valves 46 as hereinabove described. When the pressure upon rod 66 is removed therefrom, said rod will automatically return to its initial position under the influence of spring 75, whereupon collar 74 will reëngage end 72 of collar 71 and will return shaft 65 to its normal position. Finally, the provision of suitable means is contemplated for breaking the ignition circuit when the operating rod is actuated. To effect this result, there is included in the ignition circuit a knife switch 77, which is secured to the dash-board adjacent the aforesaid rod, the latter having a loose connection 78 with the blade member 79 of the switch. Accordingly, the operative movement of said rod will disengage said blade from the terminal plates 80 of the switch, to which the wires 81 and 82 are attached, thereby breaking the circuit until said rod returns to its normal position and reopens the circuit by again engaging said blade with said terminal plates.

The wires above mentioned may obviously form part of either the primary or the secondary circuit when a double circuit system is employed. By reason of this construction, it will be seen that ignition of the starting charge will not take place until said charge has entered the combustion chamber of the proper cylinder, thereby obviating all danger of premature ignition.

The complete operation is as follows: When the operating rod 66 is pushed inward, it will open the carbureter valve 10, whereupon the explosive mixture contained in chamber 11 will be free to flow through ports 13 and 18, and nipple 22, by reason of the registration of port 12 with the air inlet-port 16, into pipe 31, and thence into the distributer. At the same time, the selector is actuated by reason of the endwise movement of shaft 64 which latter carries the cam plates 63, one of these plates being actuated by the appropriate cam 59, so as to open the adjacent distributer valve 46 and permit the mixture of flow into the corresponding passage 43, thence through the plug 49 into the connected pipe 50, and, finally, through the corresponding admission valve into the explosion chamber of the proper engine cylinder. The ignition circuit is broken during the operative movement of rod 66, but is closed when said rod assumes its initial position under the influence of spring 75, whereupon the charge is fired, thus starting the engine. During the return movement of the operating rod, the endwise-movable plate-bearing shaft 64 is likewise returned, and, at the same time, the carbureter valve is rotated back to its normal position, so as to again register ports 12 and 13 with the gasolene inlet ports 15 and 17 and admit a fresh supply of gasolene into the valve chamber 11, communication between the latter and the ports 16 and 18 being thus cut off. The parts are then in position to permit the starter to be again operated after the engine has been stopped.

The various parts shown and described are employed in the embodiment of the invention which is now preferred, but it will be understood that no limitation to the exact construction and arrangement of said parts as they now appear is contemplated, since modifications and changes may well be made within the scope of the appended claims.

What I claim is:

1. In an automatic starter for multi-cylinder explosive engines, the combination of a distributer having a separate pipe connection with each cylinder of the engine, a controlling valve associated with each of said pipes, means for supplying explosive mixture to said distributer, a valve selector comprising a rotatable element and an endwise movable element operatively associated with the first-named element but normally free of engagement therewith, and means for actuating the second-named element to engage the same with said first-named element to open the selected valve.

2. In an automatic starter for multi-cylinder explosive engines, the combination of a distributer having a separate pipe connection with each cylinder of the engine, a controlling valve associated with each of said pipes, means for supplying explosive mixture to said distributer, a valve selector comprising an element rotatable with relation to all of said valves and an element operatively associated with the first-named element but normally free of engagement therewith, and means for actuating the second-named element to engage the same with said first-named element to open the selected valve.

3. In an automatic starter for multi-cylinder explosive engines, the combination of a distributer having a separate pipe connection with each cylinder of the engine, a controlling valve associated with each of said pipes, means for supplying explosive mixture to said distributer, a valve selector comprising an element rotatable with relation to all of said valves, an element operatively associated therewith, and a push rod for actuating the second-named element to open the selected valve.

4. In an automatic starter for multi-cylinder explosive engines, the combination of a distributer having a separate pipe connection with each cylinder of the engine, a controlling valve associated with each of said pipes, means for supplying explosive mixture to said distributer, a valve selector comprising an element provided with a separate member for opening each valve, a companion element provided with a separate actuating member for each first-named member, and means for moving one of said elements relative to the other to actuate the selected first-named member.

5. In an automatic starter for multi-cylinder explosive engines, the combination of a distributer having a separate pipe connection with each cylinder of the engine, a controlling valve associated with each of said pipes, means for supplying explosive mixture to said distributer, a valve selector comprising an element provided with a separate rocking member for opening each valve, a companion element provided with a separate actuating member for each first-named member, and means for moving one of said elements relative to the other to rock the selected first-named member.

6. In an automatic starter for multicylinder explosive engines, the combination of a distributer having a separate pipe connection with each cylinder of the engine, a controlling valve associated with each of said pipes, means for supplying explosive mixture to said distributer, a valve selector comprising a shaft provided with a separate rocking plate for opening each valve and a companion element to said shaft and provided with a separate member for rocking each plate, and means for moving one of said elements relative to the other to rock the selected plate.

7. In an automatic starter for multicylinder explosive engines, the combination of a distributer having a separate pipe connection with each cylinder of the engine, a controlling valve assocated with each of said pipes, means for supplying explosive mixture to said distributer, a valve selector comprising an endwise movable element provided with a separate member for opening each valve and a rotary element provided with a separate member for actuating each first-named member, and a push rod connected with the first-named element for moving same endwise in one direction to actuate one of its members by the corresponding member on the second-named element.

8. In an automatic starter for multicylinder explosive engines, the combination of a distributer having a separate pipe connection with each cylinder of the engine, a controlling valve associated with each of said pipes, means for supplying explosive mixture to said distributer, a valve selector comprising an endwise movable element provided with a separate member for opening each valve and a shaft provided with a separate cam for actuating each member, means for rotating said shaft from the engine while the latter is running, and means for moving said element endwise, when the engine is to be started, to actuate one of said members by the corresponding cam.

9. In an automatic starter for multicylinder explosive engines, the combination of a distributer having a separate pipe connection with each cylinder of the engine, a controlling valve associated with each of said pipes, means for supplying explosive mixture to said distributer, a valve selector comprising an endwise movable element provided with a separate member for opening each valve and a shaft provided with a separate plate for opening each valve and a second shaft provided with a separate cam for actuating each plate, and means for moving one of said shafts relative to the other to actuate one of said plates by the corresponding cam.

10. In an automatic starter for multicylinder explosive engines, the combination of a distributer having a separate pipe connection with each cylinder of the engine, a controlling valve associated with each of said pipes, means for supplying explosive mixture to said distributer, a valve selector comprising an endwise movable element provided with a separate member for opening said valve and a shaft provided with a separate plate for opening each valve and a second shaft provided with a separate cam for actuating each plate, means for rotating the second-named shaft from the engine while the latter is running, and means for moving the first-named shaft endwise when the engine is to be started to operate one of said plates by the corresponding cam.

11. In an automatic starter for multicylinder explosive engines, the combination of a distributer having a separate pipe connection with each cylinder of the engine, a controlling valve associated with each of said pipes, means for supplying explosive mixture to said distributer, a valve selector comprising a pair of companion elements, means for rotating one of said elements from the engine while the latter is running, and means for moving one of said elements endwise relative to the other when the engine is to be started.

12. In an automatic starter for multicylinder explosive engines, the combination of a distributer having a separate pipe connection with each cylinder of the engine, a controlling valve associated with each of said pipes, means for supplying explosive mixture to said distributer, a valve selector comprising a pair of companion elements arranged in spaced parallel relation to, but normally free of engagement with each other, means for rotating one of said elements from the engine while the latter is running, and means for moving the other element endwise relative to the first-named element, when the engine is to be started to engage the same with said first-named element to open the selected valve.

13. In an automatic starter for multicylinder explosive engines, the combination of a distributer having a separate pipe connection with each cylinder of the engine, a controlling valve associated with each of said pipes, means for supplying explosive mixture to said distributer, a valve selector comprising a shaft provided with a separate member for opening each valve, a second shaft provided with a spirally arranged series of cams, each of said cams being adapted to operate one of said members, means for rotating the second-named shaft from the engine, while the latter is running, to dispose one of said cams in position to actuate one of said members, and means for moving the first-named shaft endwise when the engine is to be started, to actuate the selected member by the selected cam.

14. In an automatic starter for multicylinder explosive engines, the combination of a distributer having a separate pipe connection with each cylinder of the engine, a controlling valve associated with each of said pipes, means for supplying explosive mixture to said distributer, a valve selector comprising a shaft provided with a separate rocking plate for opening each valve, a second shaft provided with a spirally arranged series of cams, each cam being arranged to engage and rock one of said plates, means for rotating the second-named shaft from the engine, while the latter is running, to dispose one of said cams in operative position with respect to a plate, and means for moving the first-named shaft endwise when the engine is to be started, to engage the selected plate by the selected cam.

15. In an automatic starter for multicylinder explosive engines, the combination of a distributer having a separate pipe connection with each cylinder of the engine, a controlling valve associated with each of said pipes, means for supplying explosive mixture to said distributer, a valve selecting and opening device comprising an endwise movable element and a rotatable element, a push rod, means connecting said rod with said endwise movable element, and means carried by said rod for operating said connecting means.

16. In an automatic starter for multicylinder explosive engines, the combination of a distributer having a separate pipe connection with each cylinder of the engine, a controlling valve associated with each of said pipes, means for supplying explosive mixture to said distributer, a valve selecting and opening device comprising an endwise movable element and a rotatable element, a push rod, a member secured to said endwise movable element and slidably engaged with said rod, and a pair of collars borne by said rod and disposed upon opposite sides of said member for alternate engagement therewith.

17. In an automatic starter for multicylinder explosive engines, the combination of a distributer having a separate pipe connection with each cylinder of the engine, a controlling valve associated with each pipe, a carbureter communicating with said distributer for supplying explosive mixture thereto, a valve movably mounted in the carbureter, a selector associated with said controlling valves, and a common operating device for said carbureter valve and said selector.

18. In an automatic starter for multicylinder explosive engines, the combination of a distributer having a separate pipe connection with each cylinder of the engine, a controlling valve associated with each pipe, a carbureter communicating with said distributer for supplying explosive mixture thereto, a valve movably mounted in the carbureter, a selector associated with said controlling valves, and means for simultaneously operating said selector and said carbureter valve.

19. In an automatic starter for multicylinder explosive engines, the combination of a distributer having a separate pipe connection with each cylinder of the engine, a controlling valve associated with each pipe, a carbureter communicating with said distributer for supplying explosive mixture thereto, a valve movably mounted in the carbureter, a selector associated with said controlling valves, a push rod, connections between said rod and the carbureter valve for opening the latter when the former is pushed inwardly, and additional connections between said rod and the selector for operating said selector.

20. In an automatic starter for multicylinder explosive engines, the combination of a distributer having a separate pipe connection with each cylinder of the engine, a controlling valve associated with each pipe, a carbureter communicating with said distributer for supplying explosive mixture thereto, a valve movably mounted in the carbureter, a selector associated with said controlling valves and including coacting endwise movable and rotatable elements, and an operating rod connected with the carbureter valve and with the endwise movable element.

21. In an automatic starter for multicylinder explosive engines, the combination with an ignition circuit having a switch provided with a movable operating member included therein, of a distributer having a separate pipe connection with each cylinder of the engine, a controlling valve associated with each of said pipes, a carbureter in communication with said distributer for supplying explosive mixture thereto, a valve movably mounted in said carbureter, a selector associated with said controlling valves, and a common operating member for said selector, said carbureter valve, and said switch member.

22. In an automatic starter for multicylinder explosive engines, the combination with an ignition circuit having a switch provided with a movable operating member included therein, of a distributer having a separate pipe connection with each cylinder of the engine, a controlling valve associated with each of said pipes, a carbureter in communication with said distributer for supplying explosive mixture thereto, a valve movably mounted in said carbureter, a selector associated with said controlling valves, a push rod with which said switch member is connected, and separate additional operating connections between said rod and said carbureter valve and selector.

23. In an automatic starter for multicylinder explosive engines, the combination of an ignition circuit having a movable switch member included therein, of a distributer, a carbureter in communication with the distributer and provided with a valve, a selector associated with said distributer, and a push rod connected with said switch member and valve for simultaneously breaking said circuit and opening said valve.

24. In an automatic starter for multicylinder explosive engines, the combination of an ignition circuit having a movable switch member included therein, of a distributer, a carbureter in communication with the distributer and provided with a valve, a selector associated with said distributer and including an endwise movable element, and a push rod connected with the endwise movable element, the switch member, and the carbureter valve for operating those parts in unison.

25. In an automatic starter for multicylinder explosive engines, the combination of a distributer comprising a tubular body provided with a series of tubular lateral extensions each of which has a separate pipe in communication with a cylinder of the engine, a controlling valve arranged within each extension, a selector associated with all of said valves, a carbureter communicating with said body, and a push rod for operating said selector.

26. In an automatic starter for multicylinder explosive engines, the combination of a distributer comprising a tubular body provided with a series of tubular lateral extensions each of which has a separate pipe in communication with a cylinder of the engine, a controlling valve arranged within each extension, a selector associated with all of said valves, a carbureter communicating with said body, a valve movably mounted in said carbureter, and a push rod connected with said carbureter valve and said selector for simultaneously opening the former and operating the latter.

27. In an automatic starter for multi-cylinder explosive engines, the combination of a distributer, a carbureter in communication therewith and provided with a rotary valve, a selector associated with said distributer, and a member connected with said valves and said selector for simultaneously opening the former and operating the latter.

28. In an automatic starter for multi-cylinder explosive engines, the combination of a distributer, a carbureter in communication therewith and provided with a rotary valve, a selector associated with said distributer and including an endwise movable element, and a member connected with said valve and said element for simultaneously rotating the former and imparting endwise movement to the latter.

In testimony whereof I hereunto affix my signature in the presence of two witnesses.

MYRON T. BAIRD.

Witnesses:
LOTTIE M. FOX,
BERTHA VON BEHRENS.

---

Copies of this patent may be obtained for five cents each, by addressing the "Commissioner of Patents, Washington, D. C."